June 10, 1930.                M. OSNOS                1,762,346
                    ARRANGEMENT FOR FREQUENCY CHANGING
                            Filed Feb. 20, 1925
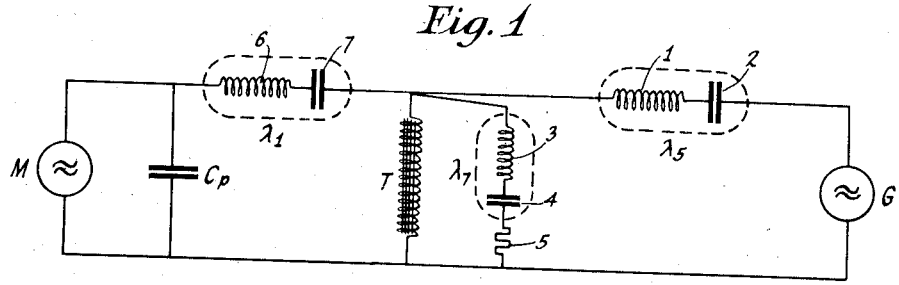
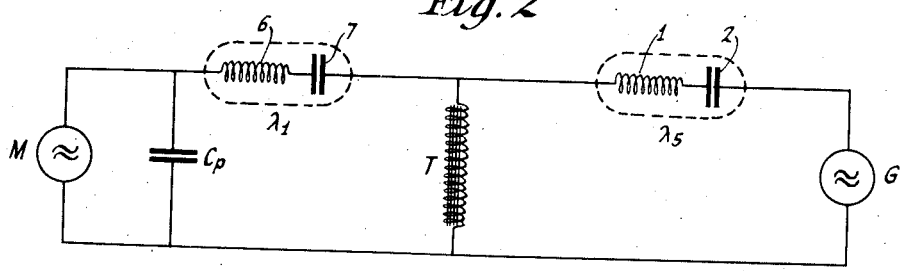
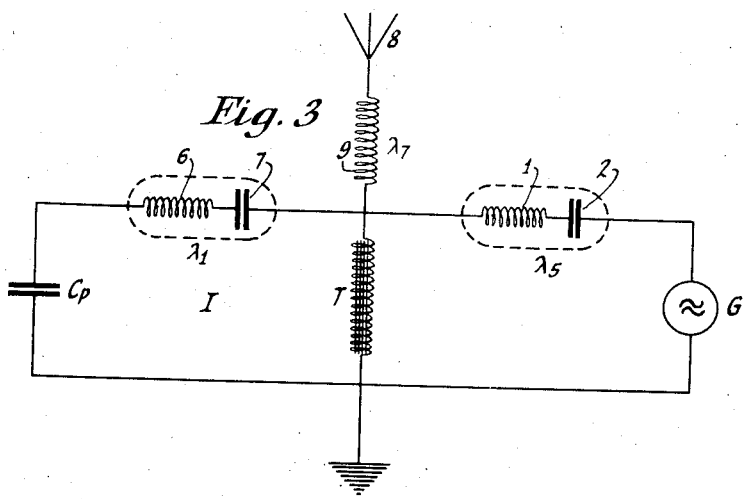
INVENTOR
MENDEL OSNOS
BY
ATTORNEY Patented June 10, 1930

1,762,346

UNITED STATES PATENT OFFICE

MENDEL OSNOS, OF BERLIN, GERMANY, ASSIGNOR TO GESELLSCHAFT FÜR DRAHTLOSE TELEGRAPHIE M. B. H., OF BERLIN, GERMANY

ARRANGEMENT FOR FREQUENCY CHANGING

Application filed February 20, 1925, Serial No. 10,535, and in Germany February 23, 1924.

My invention relates to a method and means for changing energy from a given frequency to another frequency and has for its object to provide such a method and means for changing a given generator frequency to frequencies which may be less than the generator frequency and also to frequencies which may be greater than the generator frequency but which need not be of such magnitude that their ratio to that of the generator is a simple whole number. The ratio may be any proper or improper fraction without regard to rationality, and the harmonics need not be even or odd harmonics in the true sense, but may be the so-called quasi-harmonics.

Other objects will be apparent from the following description and claims when considered with the accompanying drawing in which:

Figs. 1, 2 and 3 illustrate different ways in which my invention may be practiced.

The multiplying of a given generator frequency by means of static frequency changers may generate not only the harmonics of the fundamental frequency which are whole numbers but also frequencies, the ratio of which with regard to the frequency of the generator are not whole numbers. One explanation, the correctness of which I do not intend to be a limitation of the invention, is that such quasi-harmonics or fractionally higher frequencies can exist only if there is somewhere in the whole system, consisting of generator, the frequency changer and the separate oscillatory circuits, some fundamental frequency true harmonics of which may be quasi-harmonics of the original generator frequency.

The present invention now provides for the withdrawal of energy at this fundamental frequency which is lower than the generator frequency, and so provides a method for reducing the generator frequency. Other frequencies, harmonics, and quasi-harmonics can also be utilized, either simultaneously with the utilization of the reduced frequency, or independently, that is, without withdrawing any energy from the circuits at the reduced frequency.

The following examples show a few of the many possible applications of the invention, and are intended as description, and not limitation.

Referring to Fig. 2, G is a radio frequency generator which generates a frequency corresponding to some wave, say $\lambda_5$. The primary circuit contains some generator of harmonics, say the frequency transformer T, and a tuning device comprising inductance 1 and condenser 2, appropriately dimensioned for $\lambda_5$.

A fundamental wave of lower frequency, say $\lambda_1$ of 1/5 the frequency of $\lambda_5$, may be utilized for supplying energy if such a wave is present in the system. For the purpose of obtaining the wave $\lambda_1$ the secondary circuit may be so dimensioned that it represents a capacitive reactance for this wave (a so-called frequency setter). The transformer T may, for instance, be connected to capacitive reactances such as $C_p$, or to any wire system which supplies wattless current of a lower frequency. Thus in the drawing the motor M may be a synchronous motor which will supply wattless current of the wave $\lambda_1$ while it is operating on that wave. Both a capacity $C_p$ and a motor may be connected in parallel, as shown in the drawing. As already mentioned, a wire system or also an ohmic resistance may be connected up instead of the synchronous motor M, the type of circuit or load being immaterial provided the condition $$\frac{1}{\omega C_p} \geq \gamma_t$$

is realized, $\gamma_t$ being the reactance of the transformer for $\lambda_1$. A convenient way to express this, which I shall use in the claims, is to say that the circuit must be non-inductive. The secondary circuit preferably has included in it a tuning element, comprising inductance 6, and condenser 7, for selecting the wave $\lambda_1$.

It may be seen that the usual effect is reversed to a certain extent; for, if the motor M were employed as a generator for the wave $\lambda_1$, the generator G could be used as a motor of the frequency $\lambda_5$, and this would be a known method of multiplying a frequency. According to the invention the reversal of that known process is attained by having the frequency transformer connected to a corresponding capacitive loading and having the oscillation of a lower frequency than that of the generator taken from the system by resonance means.

As the theoretical consideration shows, the generator and the motor can be interchanged, but this possibility of reversal occurs only if the combination of M and $C_p$ has a capacitive character. As above mentioned, M need not be a synchronous motor as drawn in the figure, but may be another load, such as a resistance.

Referring to Figure 1, there is shown a method of obtaining any desired quasi-harmonic. The generator G supplies a wave of frequency corresponding to $\lambda_5$. Suppose a wave having a frequency 7/5 as great is desired. By means of a circuit such as 6, 7, $C_p$, or 6, 7, M, or 6, 7, $C_p$ and M, all as previously described, a wave of 1/5 frequency is produced. Across the terminals of the frequency changing transformer T there may then be connected a circuit such as 3, 4, 5, tuned to a wave, $\lambda_7$, of seven times the frequency of $\lambda_1$. The wave $\lambda_7$, which results will be a true harmonic of $\lambda_1$, but relative to the original wave $\lambda_5$ it will be the desired quasi-harmonic, its frequency being 7/5 of the frequency originally available.

Referring now to Figure 3, a diagram of connections is shown in which the so-called quasi-harmonic, in this case the same previously supposed 7/5 frequency of the generator G, is led to an aerial circuit. This aerial circuit comprises an aerial and inductance 9 tuned to $\lambda_7$. $\lambda_1$ is the fundamental wave of the circuit I connected in parallel to the transformer.

Having disclosed several ways by which my invention may be practiced, I am entitled to all modifications thereof, as fall fairly within the scope of the following claims:

1. A frequency changer comprising a generator of harmonics; an energy supply circuit connected to said generator; an energy utilization circuit connected to said generator; and another circuit independent of the supply circuit, connected to the output side of the generator, said other circuit including the generator of harmonics being tuned to a fundamental frequency, and utilizing energy of the fundamental frequency generated by the harmonic generator; the supply circuit and said first mentioned utilization circuit being tuned to frequencies which are harmonics of the fundamental frequency.

2. A frequency changer comprising a generator of harmonics, an energy supply circuit connected to said generator; an energy utilization circuit connected to said generator; and another circuit connected to said generator, said last mentioned circuit including the generator of harmonics, being tuned to a fundamental frequency and utilizing energy of fundamental frequency generated by the harmonic generator; said supply circuit and said first mentioned utilization circuit being tuned to frequencies which are harmonics of the fundamental frequency, but not of each other.

3. In stationary frequency changing apparatus for obtaining from currents of one frequency currents of another frequency related to the first by a ratio which is not a simple whole number, a harmonic generator for changing the initial frequency currents to currents of a second, sub-harmonic frequency which is a common divisor of both the initial and the desired frequencies; and means for accentuating the flow of currents of sub-harmonic frequency through said harmonic generator whereby said generator utilizes the accentuated currents of sub-harmonic frequency to generate currents of the desired frequency.

4. An arrangement for frequency changing comprising a single saturable iron core inductance for the production of harmonics; a capacitive reactance, at least equal to the inductive reactance of the harmonic producer at a fundamental frequency and utilizing energy of fundamental frequency generated by the producer of harmonics, connected to said inductance by a circuit containing tuning means tuned to the fundamental frequency; a radio frequency generator, the frequency of which is a harmonic of the fundamental, connected to the inductance by a circuit containing tuning means tuned to the generator frequency; and a utilization circuit, connected across the saturable inductance, tuned to a frequency which is a harmonic of the fundamental frequency different from the generator frequency.

MENDEL OSNOS.